United States Patent
Shang

(10) Patent No.: US 10,659,253 B2
(45) Date of Patent: May 19, 2020

(54) PATH DETECTION METHOD AND APPARATUS

(71) Applicant: Huawei Technologies Co., Ltd., Shenzhen (CN)

(72) Inventor: Xuxiang Shang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 15/934,229

(22) Filed: Mar. 23, 2018

(65) Prior Publication Data

US 2018/0212798 A1     Jul. 26, 2018

Related U.S. Application Data

(63) Continuation of application No. PCT/CN2016/099347, filed on Sep. 19, 2016.

(30) Foreign Application Priority Data

Sep. 25, 2015   (CN) .......................... 2015 1 0621265

(51) Int. Cl.
*H04L 12/24* (2006.01)
*H04L 12/46* (2006.01)
(Continued)

(52) U.S. Cl.
CPC ...... *H04L 12/4633* (2013.01); *H04L 12/4641* (2013.01); *H04L 43/10* (2013.01);
(Continued)

(58) Field of Classification Search
None
See application file for complete search history.

(56) References Cited

U.S. PATENT DOCUMENTS

| 2013/0170490 A1 | 7/2013 | Kreeger et al. |
| 2013/0286859 A1 | 10/2013 | Wei |

(Continued)

FOREIGN PATENT DOCUMENTS

| CN | 101325584 A | 12/2008 |
| CN | 101800679 A | 8/2010 |

(Continued)

OTHER PUBLICATIONS

Virtual eXtensible Local Area Network (VXLAN): A Framework for Overlaying Virtualized Layer 2 Networks over Layer 3 Networks, RFC all pages, Aug. 2014 (Year: 2014).*

(Continued)

*Primary Examiner* — Brandon M Renner
(74) *Attorney, Agent, or Firm* — Conley Rose, P.C.

(57) ABSTRACT

A path detection method and apparatus, where the method includes generating M virtual extensible local area network (VXLAN) probe packets according to a source User Datagram Protocol (UDP) port number, a destination UDP port number, and a probe identifier when there are multiple equivalent paths between a source VXLAN tunnel endpoint (VTEP) and a destination VTEP, sending the M VXLAN probe packets to the source VTEP to forward the M VXLAN probe packets to the destination VTEP, receiving VXLAN advertisement packets from the source VTEP, the destination VTEP, and intermediate nodes in the multiple equivalent paths according to the M VXLAN probe packets, and detecting, according to the VXLAN advertisement packets, whether a fault occurs in a path of the multiple equivalent paths between the source VTEP and the destination VTEP.

20 Claims, 8 Drawing Sheets

(51) Int. Cl.
*H04L 12/707* (2013.01)
*H04L 12/26* (2006.01)
*H04L 12/761* (2013.01)
*H04L 29/06* (2006.01)
*H04L 12/721* (2013.01)

(52) U.S. Cl.
CPC .............. *H04L 43/12* (2013.01); *H04L 45/16* (2013.01); *H04L 45/24* (2013.01); *H04L 69/164* (2013.01); *H04L 41/06* (2013.01); *H04L 45/26* (2013.01); *H04L 2212/00* (2013.01)

(56) References Cited

U.S. PATENT DOCUMENTS

| | | | |
|---|---|---|---|
| 2014/0348006 A1* | 11/2014 | Jain | H04L 43/0811 370/245 |
| 2014/0348166 A1* | 11/2014 | Yang | H04L 45/124 370/392 |
| 2015/0003259 A1 | 1/2015 | Gao | |
| 2015/0049765 A1 | 2/2015 | Tatsumi | |
| 2015/0124629 A1 | 5/2015 | Pani | |
| 2015/0358232 A1* | 12/2015 | Chen | H04L 45/72 370/392 |
| 2015/0381386 A1* | 12/2015 | Sigoure | H04L 12/4645 370/392 |
| 2016/0149808 A1* | 5/2016 | Cai | H04L 12/4633 370/395.53 |
| 2016/0197853 A1* | 7/2016 | Kumar | H04L 45/02 370/389 |
| 2016/0330046 A1* | 11/2016 | Yang | H04L 12/4641 |
| 2016/0381015 A1* | 12/2016 | Ravinutala | H04W 80/02 726/7 |
| 2017/0078150 A1* | 3/2017 | Koganti | H04L 12/4633 |

FOREIGN PATENT DOCUMENTS

| | | |
|---|---|---|
| CN | 102177681 A | 9/2011 |
| CN | 104270282 A | 1/2015 |
| JP | 2015039135 A | 2/2015 |
| WO | 2013115177 A1 | 8/2013 |
| WO | 2014189709 A1 | 11/2014 |

OTHER PUBLICATIONS

Machine Translation and Abstract of Chinese Publication No. CN101325584, Dec. 17, 2008, 21 pages.
Machine Translation and Abstract of Chinese Publication No. CN101800679, Aug. 11, 2010, 16 pages.
Foreign Communication From a Counterpart Application, PCT Application No. PCT/CN2016/099347, English Translation of International Search Report dated Dec. 7, 2016, 2 pages.
Foreign Communication From a Counterpart Application, PCT Application No. PCT/CN2016/099347, English Translation of Written Opinion dated Dec. 7, 2016, 7 pages.
Machine Translation and Abstract of Chinese Publication No. CN104270282, Jan. 7, 2015, 15 pages.
Foreign Communication From a Counterpart Application, Chinese Application No. 201510621265.8, Chinese Office Action dated Mar. 21, 2019, 6 pages.
Jain, P., et al., "Generic Overlay OAM and Datapath Failure Detection," XP015096791, draft-jain-nvo3-overlay-oam-01, Feb. 12, 2014, 44 pages.
Larsen, M., "Recommendations for Transport-Protocol Port Randomization," RFC 6056, XP055495614, Jan. 31, 2011, 30 pages.
Foreign Communication From a Counterpart Application, European Application No. 16848079.6, Extended European Search Report dated Aug. 3, 2018, 18 pages.
Foreign Communication From a Counterpart Application, European Application No. 16848079.6, European Office Action dated Jul. 26, 2019, 11 pages.
Foreign Communication From a Counterpart Application, Japanese Application No. 2018-515523, Japanese Office Action dated Jun. 17, 2019, 3 pages.
Foreign Communication From a Counterpart Application, Japanese Application No. 2018-515523, English Translation of Japanese Office Action dated Jun. 17, 2019, 4 pages.

* cited by examiner

Table 1

| Outer MAC DA | Outer MAC SA | Outer 8021.Q | Outer IP DA | Outer IP SA | Outer UDP SP | Destination port number 4789 | Outer UDP Len | Outer UDP CRC | VXLAN Header 8 bytes | Inner MAC DA | Inner MAC SA | Optional inner 8021.Q | Original Ethernet payload |
|---|---|---|---|---|---|---|---|---|---|---|---|---|---|

←——————————————— Header ———————————————→ ←——— Data payload ———→

FIG. 12

Table 2

| Flags (8 bits) | | | | | | | | Reserved1 24 bits | |
|---|---|---|---|---|---|---|---|---|---|
| R | R | R | R | I | R | R | R | | |
| VXLAN network identifier (VNI) 24 bits | | | | | | | | Reserved2 8 bits | |

←——————————— VXLAN header ———————————→

FIG. 13

PATH DETECTION METHOD AND APPARATUS

CROSS-REFERENCE TO RELATED APPLICATIONS

This application is a continuation of International Patent Application No. PCT/CN2016/099347 filed on Sep. 19, 2016, which claims priority to Chinese Patent Application No. 201510621265.8 filed on Sep. 25, 2015. The disclosures of the aforementioned applications are hereby incorporated by reference in their entireties.

TECHNICAL FIELD

Embodiments of the present application relate to the Virtual eXtensible Local Area Network (VXLAN) technologies, and in particular, to a path detection method and apparatus.

BACKGROUND

VXLAN is a technology used to encapsulate a Layer 2 packet using a Layer 3 protocol. A principle of the VXLAN is as follows. A packet sent by a virtual machine is encapsulated into a User Datagram Protocol (UDP) packet, the UDP packet is encapsulated using an Internet Protocol (IP) address or a media access control (MAC) address of a physical network as an outer header, the encapsulated UDP packet is transmitted over the Internet, the encapsulated UDP packet is decapsulated by a destination node, and the decapsulated packet is sent to a target virtual machine.

FIG. 1 is a schematic structural diagram of VXLAN networking. As shown in FIG. 1, a VXLAN may be divided into three layers, an access layer, a convergence layer, and a core layer. An access node 4 at the access layer is a user-side access device directly connected to a virtual machine server 5, and the virtual machine server 5 accesses the VXLAN network using the access node 4. A convergence node 3 at the convergence layer is an intermediate node in a VXLAN link and used to forward data. A core node 2 at the core layer is connected to a wide area network (WAN) 6 using another node 1. A controller 7 is connected to each device in the VXLAN, and the controller 7 may deliver data to the device, and may query data information from the device in order to control the entire network. The core node 2 at the core layer is connected to all convergence nodes 3. The convergence node 3 is connected to all local access nodes 4. A dynamic routing protocol is configured between the core node 2 and the convergence node 3 and between the convergence node 3 and the access node 4. Data communication is performed between nodes using multiple equivalent paths. For ease of management, a concept of a VXLAN tunnel endpoint (VTEP) is introduced in the VXLAN standard. The VTEP is used to encapsulate and decapsulate a VXLAN packet. Both the access node 4 and the convergence node 3 in the VXLAN may be used as VTEPs. There may be multiple equivalent paths between every two VTEPs.

However, there are many VTEPs in the VXLAN, and there are multiple equivalent paths between the VTEPs. As a result, when a path between the VTEPs fails, the faulty path cannot be determined in a timely manner.

SUMMARY

Embodiments of the present application provide a path detection method and apparatus in order to find a faulty path in a timely manner and perform corresponding processing to avoid impact caused by long-time existence of the faulty path.

According to a first aspect, an embodiment of the present application provides a path detection method, including generating M VXLAN probe packets according to a source UDP port number, a destination UDP port number, and a probe identifier, where M is greater than or equal to 2 when there are multiple equivalent paths between a source VTEP and a destination VTEP, sending the M VXLAN probe packets to the source VTEP such that the source VTEP forwards the M VXLAN probe packets to the destination VTEP, receiving VXLAN advertisement packets reported by the source VTEP, the destination VTEP, and intermediate nodes in the multiple equivalent paths according to the M VXLAN probe packets, and detecting, according to the VXLAN advertisement packets, whether a fault occurs in a path of the multiple equivalent paths between the source VTEP and the destination VTEP.

With reference to the first aspect, in a first possible implementation of the first aspect, detecting, according to the VXLAN advertisement packet, whether a fault occurs in a path of the multiple equivalent paths between the source VTEP and the destination VTEP includes determining, according to an IP address of the source VTEP, an IP address of the destination VTEP, a Layer 4 port number of the source VTEP, a Layer 4 port number of the destination VTEP, a protocol type between the source VTEP and the destination VTEP, a time to live (TTL), and an ingress port, an egress port, and a system identifier of a device that sends each VXLAN advertisement packet, whether a fault occurs in a path of the multiple equivalent paths, where the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet are carried in the VXLAN advertisement packets.

With reference to the first aspect or the first possible implementation of the first aspect, in a second possible implementation of the first aspect, generating M VXLAN probe packets according to a source UDP port number, a destination UDP port number, and a probe identifier includes generating the M VXLAN probe packets according to the M consecutive source UDP port numbers from a preset source UDP port, the destination UDP port number, and the probe identifier.

With reference to the first aspect or the first possible implementation of the first aspect, in a third possible implementation of the first aspect, generating M VXLAN probe packets according to a source UDP port number, a destination UDP port number, and a probe identifier includes performing a hash operation on each of N consecutive source UDP port numbers and the IP address of the source VTEP, the IP address of the destination VTEP, the Layer 4 port number of the destination VTEP, and the protocol type between the source VTEP and the destination VTEP to obtain hash values, where N is a maximum value of the source UDP port numbers, and N is a positive integer greater than or equal to 2, grouping the N consecutive source UDP port numbers into M first sets according to the hash values, where hash values corresponding to all source UDP port numbers in each of the first sets are equal, and M is less than or equal to N, obtaining a source UDP port number from each of the first sets to form a second set, and generating the M VXLAN probe packets according to each source UDP port number in the second set, the destination UDP port number, and the probe identifier.

With reference to the first aspect or any possible implementation of the first aspect, in a fourth possible implementation of the first aspect, the probe identifier is set in a reserved field of a VXLAN header of each VXLAN probe packet.

According to a second aspect, an embodiment of the present application provides a path detection method, including receiving a VXLAN probe packet, where the VXLAN probe packet includes a source UDP port number, a destination UDP port number, and a probe identifier, and sending a VXLAN advertisement packet to a controller according to the probe identifier, where the VXLAN advertisement packet carries the probe identifier, and a source IP address, a destination IP address, a source UDP port number, a destination UDP port, a protocol type, and a TTL in the VXLAN advertisement packet are the same as those in the VXLAN probe packet, and a source MAC address and a destination MAC address in the VXLAN advertisement packet are different from those in the VXLAN probe packet.

With reference to the second aspect, in a first possible implementation of the second aspect, the probe identifier is set in a reserved field of a VXLAN header of the VXLAN advertisement packet, and the VXLAN advertisement packet further includes an ingress port, an egress port, and a system identifier of a device that sends the VXLAN advertisement packet.

According to a third aspect, an embodiment of the present application provides a path detection apparatus, including a generation component configured to generate M VXLAN probe packets according to a source UDP port number, a destination UDP port number, and a probe identifier when there are multiple equivalent paths between a source VTEP and a destination VTEP, where M is greater than or equal to 2, a sending component configured to send the M VXLAN probe packets to the source VTEP such that the source VTEP forwards the M VXLAN probe packets to the destination VTEP, a receiving component configured to receive VXLAN advertisement packets reported by the source VTEP, the destination VTEP, and intermediate nodes in the multiple equivalent paths according to the M VXLAN probe packets, and a detection component configured to detect, according to the VXLAN advertisement packets, whether a fault occurs in a path of the multiple equivalent paths between the source VTEP and the destination VTEP.

With reference to the third aspect, in a first possible implementation of the third aspect, the detection component is further configured to determine, according to an IP address of the source VTEP, an IP address of the destination VTEP, a Layer 4 port number of the source VTEP, a Layer 4 port number of the destination VTEP, a protocol type between the source VTEP and the destination VTEP, a TTL, and an ingress port, an egress port, and a system identifier of a device that sends each VXLAN advertisement packet, whether a fault occurs in a path of the multiple equivalent paths, where the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet are carried in the VXLAN advertisement packets.

With reference to the third aspect or the first possible implementation of the third aspect, in a second possible implementation of the third aspect, the generation component is further configured to generate the M VXLAN probe packets according to the M consecutive source UDP port numbers from a preset source UDP port number range, the destination UDP port number, and the probe identifier.

With reference to the third aspect or the first possible implementation of the third aspect, in a third possible implementation of the third aspect, the generation component is further configured to perform a hash operation on each of N consecutive source UDP port numbers and the IP address of the source VTEP, the IP address of the destination VTEP, the Layer 4 port number of the destination VTEP, and the protocol type between the source VTEP and the destination VTEP to obtain hash values, where N is a maximum value of the source UDP port numbers, and N is a positive integer greater than or equal to 2, group the N consecutive source UDP port numbers into M first sets according to the hash values, where hash values corresponding to all source UDP port numbers in each of the first sets are equal, and M is less than or equal to N, obtain a source UDP port number from each of the first sets to form a second set, and generate the M VXLAN probe packets according to each source UDP port number in the second set, the destination UDP port number, and the probe identifier.

With reference to the third aspect or any possible implementation of the third aspect, in a fourth possible implementation of the third aspect, the probe identifier is set in a reserved field of a VXLAN header of each VXLAN probe packet.

According to a fourth aspect, an embodiment of the present application provides a path detection apparatus, including a receiving component configured to receive a VXLAN probe packet, where the VXLAN probe packet includes a source UDP port number, a destination UDP port number, and a probe identifier, and a sending component configured to send a VXLAN advertisement packet to a controller according to the probe identifier, where the VXLAN advertisement packet carries the probe identifier, and a source IP address, a destination IP address, a source UDP port number, a destination UDP port, a protocol type, and a TTL in the VXLAN advertisement packet are the same as those in the VXLAN probe packet, and a source MAC address and a destination MAC address in the VXLAN advertisement packet are different from those in the VXLAN probe packet.

With reference to the fourth aspect, in a first possible implementation of the fourth aspect, the probe identifier is set in a reserved field of a VXLAN header of the VXLAN advertisement packet, and the VXLAN advertisement packet further includes an ingress port, an egress port, and a system identifier of a device that sends the VXLAN advertisement packet.

According to the path detection method and apparatus provided in the embodiments, when there are multiple equivalent paths between the source VTEP and the destination VTEP, the controller generates the M VXLAN probe packets according to the source UDP port number, the destination UDP port number, and the probe identifier, sends the M VXLAN probe packets to the source VTEP such that the source VTEP forwards the M VXLAN probe packets to the destination VTEP, receives the VXLAN advertisement packets reported by the source VTEP, the destination VTEP, and intermediate nodes in the multiple equivalent paths according to the M VXLAN probe packets, and detects, according to the VXLAN advertisement packet, whether a fault occurs in paths between the source VTEP and the destination VTEP. In the embodiments, the controller constructs a VXLAN probe packet, and determines, according to the VXLAN advertisement packets reported by the source VTEP, the intermediate nodes, and the destination VTEP, paths that exist between the source VTEP and the destination VTEP in order to determine all paths in an entire VXLAN and detect all the paths. According to the present application, a faulty path can be found in a timely manner, and corresponding processing can be performed to avoid impact caused by long-time existence of the faulty path.

BRIEF DESCRIPTION OF DRAWINGS

To describe the technical solutions in the embodiments of the present application more clearly, the following briefly describes the accompanying drawings required for describing the embodiments. The accompanying drawings in the following description show some embodiments of the present application, and persons of ordinary skill in the art may still derive other drawings from these accompanying drawings without creative efforts.

FIG. 12 is a table of a packet format according to an embodiment of the present application; and FIG. 13 is a table of a format of a packet header according to an embodiment of the present application.

DESCRIPTION OF EMBODIMENTS

To make the objectives, technical solutions, and advantages of the embodiments of the present application clearer, the following clearly and describes the technical solutions in the embodiments of the present application with reference to the accompanying drawings in the embodiments of the present application. The described embodiments are some but not all of the embodiments of the present application. All other embodiments obtained by persons of ordinary skill in the art based on the embodiments of the present application without creative efforts shall fall within the protection scope of the present application. All other embodiments obtained by persons of ordinary skill in the art based on the embodi-ments of the present application without creative efforts shall fall within the protection scope of the present application.

The methods provided in the embodiments of the present application are intended to resolve a technical problem that a faulty path in a VXLAN cannot be learned in a timely manner when the path fails, and therefore it is difficult to maintain the VXLAN.

The technical solutions of the present application are described in detail below with reference to specific embodiments. The following specific embodiments may be combined with each other, and same or similar concepts or processes may not be repeatedly described in some embodiments.

Figure 1:
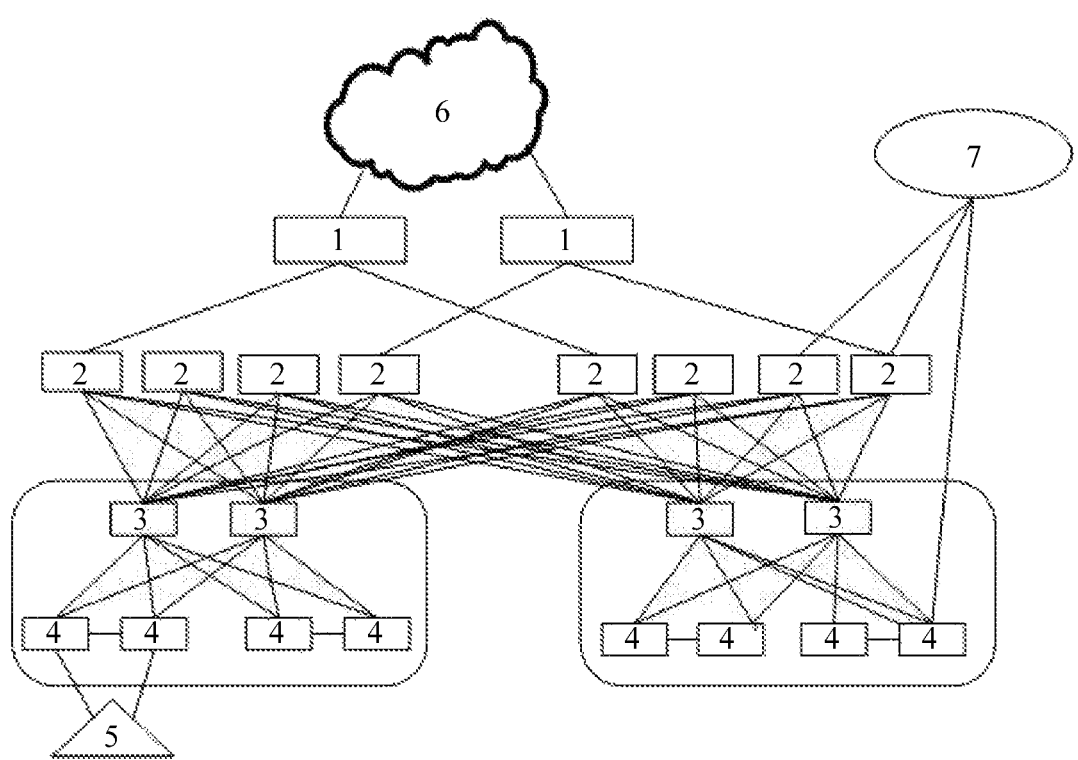
FIG. 1 is a schematic structural diagram of VXLAN networking.
Figure 2:
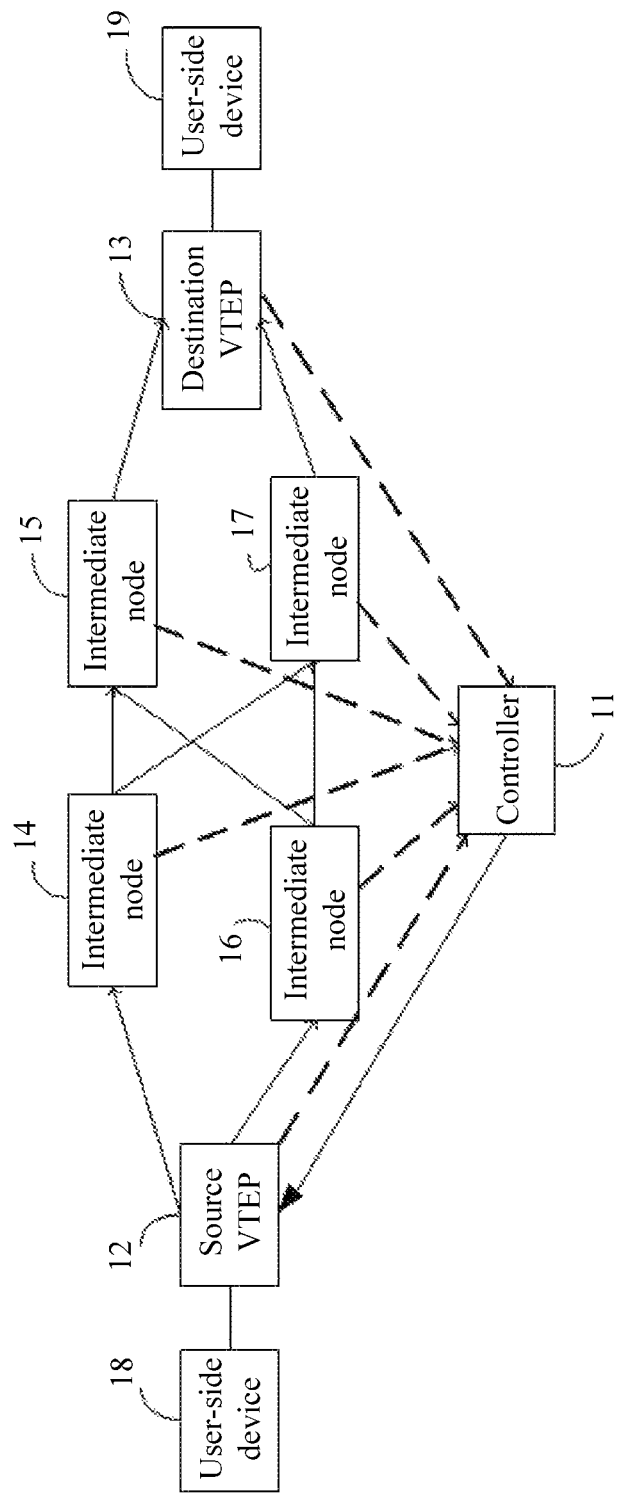
FIG. 2 is a schematic diagram of an application scenario of a path detection method according to an embodiment of the present application.

FIG. 2 is a schematic diagram of an application scenario of a path detection method according to an embodiment of the present application. As shown in FIG. 2, in the scenario, a controller 11, a source VTEP 12, a destination VTEP 13, an intermediate node 14, an intermediate node 15, an intermediate node 16, an intermediate node 17, a user-side device 18 connected to the source VTEP 12, and a user-side device 19 connected to the destination VTEP 13 are included. The controller 11 sends a VXLAN probe packet to the source VTEP 12, and the VXLAN probe packet is forwarded to the destination VTEP 13 using multiple equivalent paths. Each equivalent path is a VXLAN tunnel. The controller 11 may receive information reported by the source VTEP 12, the destination VTEP 13, and the intermediate nodes 14-17. It should be noted that only some VXLAN tunnels between two VTEPs in a VXLAN are shown in this embodiment, and more VTEPs and VXLAN tunnels may be included in an actual case.

Figure 3:
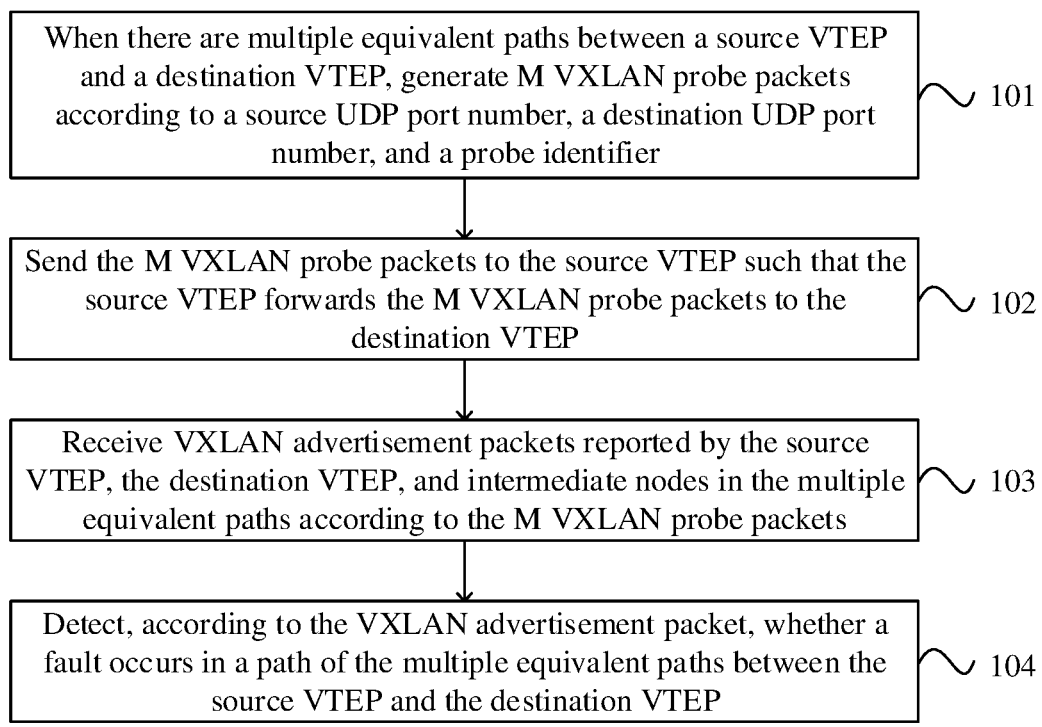
FIG. 3 is a flowchart of a path detection method according to Embodiment 1 of the present application.

FIG. 3 is a flowchart of a path detection method according to Embodiment 1 of the present application. This embodiment relates to a specific procedure in which a controller in a VXLAN sends a VXLAN probe packet to a source VTEP, receives VXLAN advertisement packets reported by the source VTEP, a destination VTEP, and an intermediate node in an equivalent path between VTEPs, and detects, according to the VXLAN advertisement packet, whether a fault occurs in a VXLAN tunnel. As shown in FIG. 3, the method in this embodiment includes the following steps.

Step 101: When there are multiple equivalent paths between a source VTEP and a destination VTEP, generate M VXLAN probe packets according to a source UDP port number, a destination UDP port number, and a probe identifier.

M is greater than or equal to 2.

In this embodiment, the source UDP port number is a source port number used for UDP encapsulation, the destination UDP port number is a destination port number used for UDP encapsulation, and the probe identifier may be a specific flag value used for marking the packet as a VXLAN probe packet. M source UDP port numbers and one fixed destination UDP port number may be determined at the same time to generate the M VXLAN probe packets. For example, source UDP port numbers of two VXLAN probe packets between the source VTEP and the destination VTEP are 100 and 101, but destination UDP port numbers of the two VXLAN probe packets both are 0x12b5. The VXLAN probe packet may be a VXLAN-format packet. Fields of the VXLAN probe packet may be set according to a format of a VXLAN advertisement packet in other approaches. For example, the probe identifier may be set in a reserved field of a VXLAN header. The source UDP port number, the destination UDP port number, a source virtual local area network (VLAN) trunking protocol (VTP) address, a destination VTP address, a user payload, and the like of the VXLAN probe packet may be added according to the format of the VXLAN packet in the other approaches, and details are not described herein.

Step 102: Send the M VXLAN probe packets to the source VTEP such that the source VTEP forwards the M VXLAN probe packets to the destination VTEP.

In this embodiment, after generating a VXLAN probe packet, the controller sends the VXLAN probe packet to the source VTEP, and the source VTEP sends the VXLAN probe packet to other intermediate nodes. The VXLAN probe packet is finally forwarded to the destination VTEP using multiple equivalent VXLAN tunnels.

Step 103: Receive VXLAN advertisement packets reported by the source VTEP, the destination VTEP, and intermediate nodes in the multiple equivalent paths according to the M VXLAN probe packets.

In this embodiment, in a VXLAN probe packet forwarding process, the source VTEP, all intermediate nodes that receive the VXLAN probe packet, and the destination VTEP need to report a VXLAN advertisement packet to the controller. The VXLAN advertisement packet carries data information of a reporting node. For example, the VXLAN advertisement packet carries information such as an ingress port number, an egress port number, an IP address, and a device name of the intermediate node.

Step 104: Detect, according to the VXLAN advertisement packet, whether a fault occurs in a path of the multiple equivalent paths between the source VTEP and the destination VTEP.

In this embodiment, the controller determines, according to the VXLAN advertisement packets reported by the source VTEP, the intermediate nodes, and the destination VTEP, equivalent paths that exist between the source VTEP and the destination VTEP in order to determine all paths in the entire VXLAN and detect all the paths periodically. If a path is found faulty, the controller determines that a fault occurs on the path, and sends alarm information to user equipment to inform a user that the path is faulty.

According to the path detection method provided in this embodiment, when there are multiple equivalent paths between the source VTEP and the destination VTEP, the controller generates the M VXLAN probe packets according to the source UDP port number, the destination UDP port number, and the probe identifier, sends the M VXLAN probe packets to the source VTEP such that the source VTEP forwards the M VXLAN probe packets to the destination VTEP, receives the VXLAN advertisement packets reported by the source VTEP, the destination VTEP, and the intermediate nodes in the multiple equivalent paths according to the M VXLAN probe packets, and detects, according to the VXLAN advertisement packet, whether a fault occurs in paths between the source VTEP and the destination VTEP. In this embodiment, the controller constructs a VXLAN probe packet, and determines, according to the VXLAN advertisement packets reported by the source VTEP, the intermediate nodes, and the destination VTEP, the paths that exist between the source VTEP and the destination VTEP in order to determine all the paths in the entire VXLAN and detect all the paths. If a path is found faulty, the controller sends alarm information to the user equipment to inform the user that the path is faulty such that the faulty path can be maintained in a timely manner.

Figure 4:
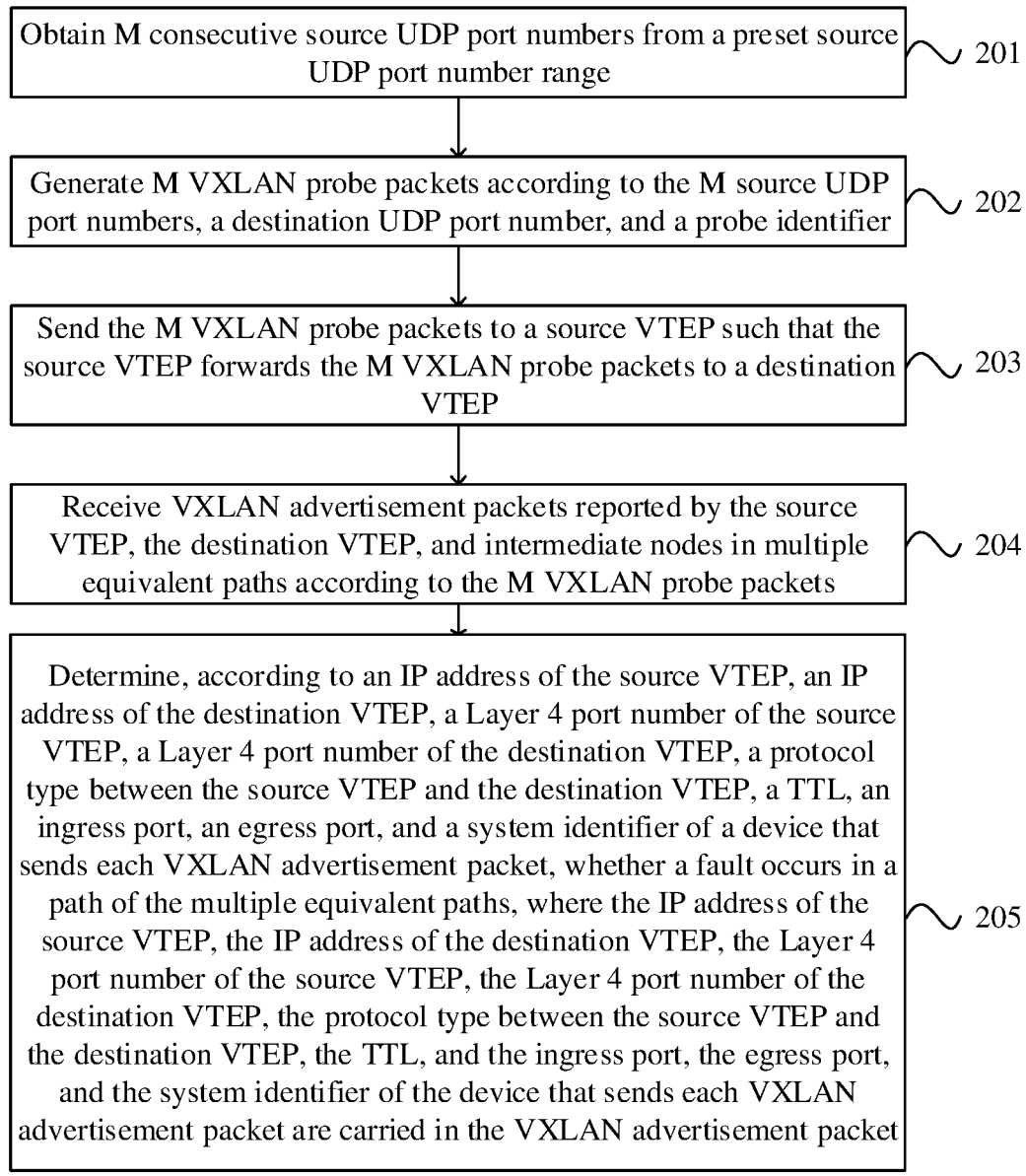
FIG. 4 is a flowchart of a path detection method according to Embodiment 2 of the present application.

FIG. 4 is a flowchart of a path detection method according to Embodiment 2 of the present application. This embodiment is a specific implementation of the method shown in FIG. 3, and relates to a specific procedure in which multiple consecutive source UDP port numbers are selected to construct VXLAN probe packets, and after a VXLAN advertisement packet is received, whether a fault occurs in paths between a source VTEP and a destination VTEP is detected according to the VXLAN advertisement packet. As shown in FIG. 4, the method includes the following steps.

Step 201: Obtain M consecutive source UDP port numbers from a preset source UDP port number range.

In this embodiment, to find, by means of detection, all paths between a source VTEP and a destination VTEP, the M consecutive source UDP port numbers may be selected from the preset source UDP port number range. For example, 50 consecutive source UDP port numbers are selected from a range [100, 200] in order to construct 50 VXLAN probe packets with the consecutive source UDP port numbers.

Step 202: Generate M VXLAN probe packets according to the M source UDP port numbers, a destination UDP port number, and a probe identifier.

Optionally, the probe identifier is set in a reserved field of a VXLAN header of each VXLAN probe packet.

In this embodiment, the VXLAN probe packet may be in a VXLAN format. For example, when a VXLAN probe packet is generated, a source UDP port number 100, a destination port number 4789, and a TTL 255 are selected, and a 16-bit flag value, that is, a probe identifier, is filled into a reserved field of a VXLAN header of the VXLAN probe packet, and a data field of the VXLAN header is valid data between VTEPs. Such information is encapsulated into a VXLAN-format packet to generate the VXLAN probe packet. Table 1 in FIG. 12 shows a packet format of the VXLAN probe packet, and Table 2 in FIG. 13 shows a format of the VXLAN header.

As shown in Table 1, the VXLAN probe packet is divided into a header and a data payload. In the header, the source UDP port number is set in an outer UDP SP field, and the destination UDP port number is set in a destination port number field. In Table 2, the VXLAN header includes two reserved fields, Reserved1 and Reserved2, and the probe identifier may be added to the reserved field Reserved2.

Step 203: Send the M VXLAN probe packets to a source VTEP such that the source VTEP forwards the M VXLAN probe packets to a destination VTEP.

Step 204: Receive VXLAN advertisement packets reported by the source VTEP, the destination VTEP, and intermediate nodes in multiple equivalent paths according to the M VXLAN probe packets.

Step 205: Determine, according to an IP address of the source VTEP, an IP address of the destination VTEP, a Layer 4 port number of the source VTEP, a Layer 4 port number of the destination VTEP, a protocol type between the source VTEP and the destination VTEP, a TTL, an ingress port, an egress port, and a system identifier of a device that sends each VXLAN advertisement packet, whether a fault occurs in a path of the multiple equivalent paths, where the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet are carried in the VXLAN advertisement packet.

In this embodiment, when receiving a VXLAN advertisement packet, a controller parses the VXLAN advertisement packet to obtain 5-tuple information of the VXLAN advertisement packet. The 5-tuple information includes the IP address of the source VTEP, the IP address of the destination VTEP, the Layer 4 port number of the source VTEP, the Layer 4 port number of the destination VTEP, and the protocol type between the source VTEP and the destination VTEP. VXLAN advertisement packets are classified according to 5-tuple information of the packets. If the 5-tuple information of the VXLAN advertisement packets is the same, the source VTEP, intermediate nodes, and the destination VTEP that report the VXLAN advertisement packets form a path. Then the controller determines a forwarding order for the intermediate nodes in the path according to the TTL and the ingress port, the egress port, and the system identifier of the device that sends the VXLAN advertisement packet in order to obtain a complete path and ultimately obtain all paths between the source VTEP and the destination VTEP, where the TTL and the ingress port, the egress port, and the system identifier of the device that sends the VXLAN advertisement packet are carried in the VXLAN advertisement packet. The controller may detect, according to a preset time cycle, whether a path is faulty. If the path is faulty, the controller determines that a fault occurs in the path, and sends alarm information to user equipment.

Optionally, the alarm information includes alarm prompt information and data information of an intermediate node in a faulty path. The data information includes information such as an ingress port number, an egress port number, an IP address, and a system identifier that are of the intermediate node in the faulty path.

According to the path detection method provided in this embodiment, the controller obtains the M consecutive source UDP port numbers from the preset source UDP port number range, generates the M VXLAN probe packets, forwards the M VXLAN probe packets to the destination VTEP using the source VTEP, receives the VXLAN advertisement packets reported by the source VTEP, the destination VTEP, and intermediate nodes in the multiple equivalent paths according to the M VXLAN probe packets, and determines, according to the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet, whether a fault occurs in a path of the equivalent paths, where the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet are carried in the VXLAN advertisement packet. The method in this embodiment is applicable to a VXLAN scenario in which a network device is not complicated. The controller sends the M VXLAN probe packets with the consecutive source UDP port numbers, and determines each path according to the VXLAN advertisement packets reported by the source VTEP, the intermediate nodes, and the destination VTEP. When detecting that a path is faulty, the controller sends alarm information to the user equipment to inform a user that the path is faulty such that the faulty path can be maintained in a timely manner.

Figure 5:
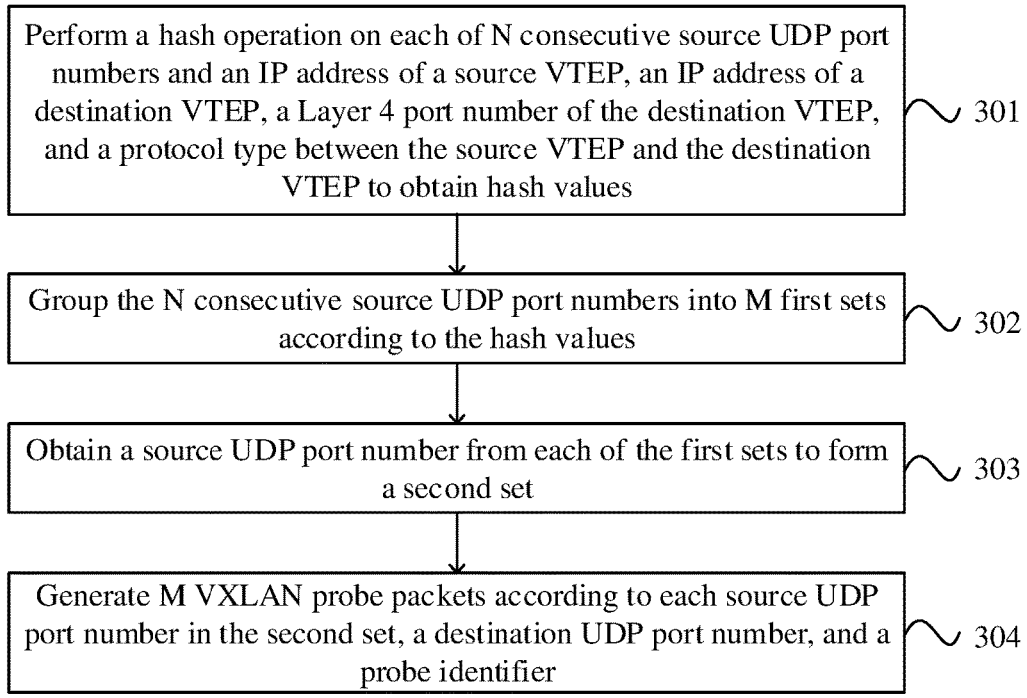
FIG. 5 is a flowchart of a path detection method according to Embodiment 3 of the present application.

FIG. 5 is a flowchart of a path detection method according to Embodiment 3 of the present application. This embodiment relates to a specific procedure in which different source UDP port numbers are selected using a hash algorithm, to construct VXLAN probe packets. Based on the foregoing embodiment shown in FIG. 3, as shown in FIG. 5, the step of "generating M VXLAN probe packets according to a source UDP port number, a destination UDP port number, and a probe identifier" includes the following steps.

Step 301: Perform a hash operation on each of N consecutive source UDP port numbers and an IP address of a source VTEP, an IP address of a destination VTEP, a Layer 4 port number of the destination VTEP, and a protocol type between the source VTEP and the destination VTEP to obtain hash values.

N is a maximum value of the source UDP port numbers, and N is a positive integer greater than or equal to 2.

In this embodiment, the source UDP port number generally ranges from 1 to 65535, and therefore, the maximum value of the source UDP port numbers is generally 65535.

Step 302: Group the N consecutive source UDP port numbers into M first sets according to the hash values.

Hash values corresponding to all source UDP port numbers in each of the first sets are equal, and M is less than or equal to N.

Step 303: Obtain a source UDP port number from each of the first sets to form a second set.

Step 304: Generate M VXLAN probe packets according to each source UDP port number in the second set, a destination UDP port number, and a probe identifier.

Figure 6:
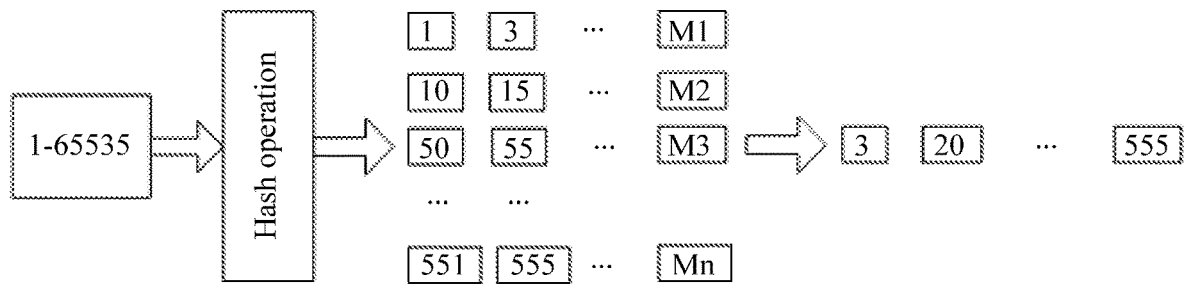
FIG. 6 is a schematic diagram of selecting a source UDP port number using a hash algorithm according to an embodiment of the present application.

FIG. 6 is a schematic diagram of selecting a source UDP port number using a hash algorithm according to an embodiment of the present application. The technical solution of this embodiment is described in detail below using FIG. 6 as an example. For ease of description, an IP address of a source VTEP, an IP address of a destination VTEP, a Layer 4 port number of the destination VTEP, and a protocol type between the source VTEP and the destination VTEP are collectively called four-tuple information. As shown in FIG. 6, a hash operation is performed on each of source UDP port numbers 1 to 65535 and the four-tuple information (not shown in the diagram) to obtain a hash value corresponding to each source UDP port number. Source UDP port numbers having a same hash value are grouped into a set to form M first sets, and one source UDP port number is selected arbitrarily from each of the first sets to form a second set. For example, in FIG. 6, {1, 3, . . . , M0}, {10, 15 . . . , M2}, {50, 55 . . . , M3}, . . . and {551, 555 . . . , Mn}, are the first sets, and {3, 20, . . . , 555} is the second set. A destination UDP port number is set to 0x12b5, and M VXLAN probe packets are constructed according to each source UDP port number in the second set, the destination UDP port number 0x12b5, and a probe identifier. In this embodiment, a format of the VXLAN probe packet is the same as the packet formats shown in Table 1 and Table 2, and is not described herein again.

According to the path detection method provided in this embodiment, the hash operation is performed on each of the N consecutive source UDP port numbers and the IP address of the source VTEP, the IP address of the destination VTEP, the Layer 4 port number of the destination VTEP, and the protocol type between the source VTEP and the destination VTEP, to obtain the hash value corresponding to each source UDP port number. The N consecutive source UDP port numbers are grouped into the M first sets according to the hash values, and the source UDP port number is obtained from each of the first sets to form the second set, and the M VXLAN probe packets are generated according to each source UDP port number in the second set, the destination UDP port number, and the probe identifier. The method in this embodiment is applicable to a VXLAN scenario in which a network device is relatively complicated. VXLAN probe packets are generated by selecting some source UDP port numbers using the hash algorithm such that a quantity of to-be-sent VXLAN probe packets can be greatly reduced, and workload of a controller and intermediate nodes in a path can be reduced.

Figure 7:
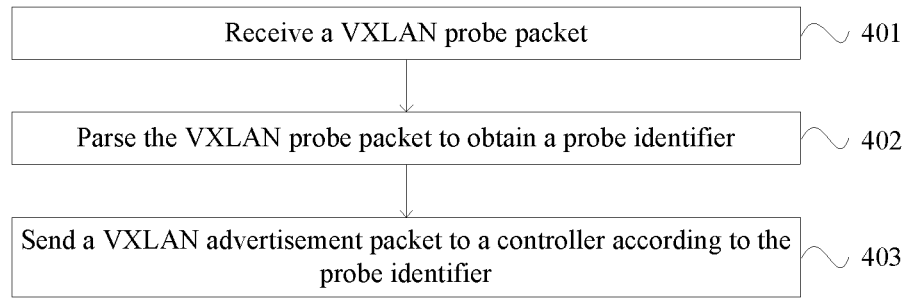
FIG. 7 is a flowchart of a path detection method according to Embodiment 4 of the present application.

FIG. 7 is a flowchart of a path detection method according to Embodiment 4 of the present application. This embodiment relates to a specific procedure in which a receive-side device receives a VXLAN probe packet, parses the VXLAN probe packet, and sends a VXLAN advertisement packet to a controller according to an obtained probe identifier. This embodiment may be executed by a source VTEP, a destination VTEP, or an intermediate node. As shown in FIG. 7, the method includes the following steps.

Step 401: Receive a VXLAN probe packet.

The VXLAN probe packet includes a source UDP port number, a destination UDP port number, and a probe identifier.

In this embodiment, the VXLAN probe packet is a VXLAN-format packet that is constructed by a controller and that is used to detect a path in a VXLAN. A format of the VXLAN probe packet is shown in Table 1 and Table 2, and is not described herein again.

Step 402: Parse the VXLAN probe packet to obtain a probe identifier.

In this embodiment, the probe identifier may be a specific flag value, and the probe identifier may be set in a reserved field of a VXLAN header of the VXLAN probe packet.

Step 403: Send a VXLAN advertisement packet to a controller according to the probe identifier.

The VXLAN advertisement packet carries the probe identifier. A source IP address, a destination IP address, a source UDP port number, a destination UDP port, a protocol type, and a TTL in the VXLAN advertisement packet are the same as those in the VXLAN probe packet, and a MAC address and a destination MAC address in the VXLAN advertisement packet are different from those in the VXLAN probe packet.

In this embodiment, when receiving the VXLAN probe packet carrying the probe identifier, the source VTEP, the destination VTEP, or the intermediate node reports the VXLAN advertisement packet to the controller.

According to the path detection method provided in this embodiment, the source VTEP, the destination VTEP, or the intermediate node receives the VXLAN probe packet, parses the VXLAN probe packet to obtain the probe identifier, and sends the VXLAN advertisement packet to the controller according to the probe identifier such that the controller can detect, according to the VXLAN advertisement packet, whether a fault occurs in a path of multiple equivalent paths between the source VTEP and the destination VTEP. If a path is faulty, the controller can inform a user that the path is faulty such that the faulty path can be maintained in a timely manner.

Optionally, based on the embodiment shown in FIG. 7, the probe identifier is set in a reserved field of a VXLAN header of the VXLAN advertisement packet, and the VXLAN advertisement packet further includes an ingress port, an egress port, and a system identifier of a device that sends the VXLAN advertisement packet.

In this embodiment, the probe identifier is set in the reserved field of the VXLAN header of the VXLAN advertisement packet, and no additional field is required such that bandwidth is reduced. In addition, the VXLAN advertisement packet further includes the ingress port, the egress port, and the system identifier of the device that sends the VXLAN advertisement packet such that the controller can obtain equivalent paths between VTEPs according to the ingress port, the egress port, and the system identifier of the device.

Figure 8:
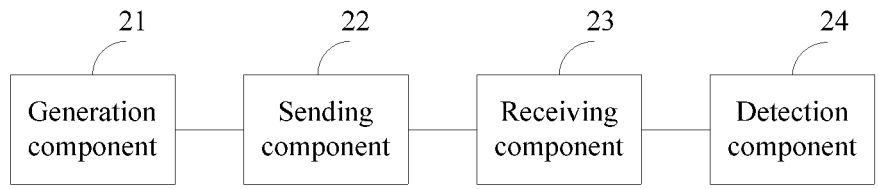
FIG. 8 is a schematic structural diagram of a path detection apparatus according to Embodiment 5 of the present application.

FIG. 8 is a schematic structural diagram of a path detection apparatus according to Embodiment 5 of the present application. As shown in FIG. 8, the apparatus includes a generation component 21, a sending component 22, a receiving component 23, and a detection component 24. The generation component 21 is configured to generate M VXLAN probe packets according to a source UDP port number, a destination UDP port number, and a probe identifier when there are multiple equivalent paths between a source VTEP and a destination VTEP, where M is greater than or equal to 2. The sending component 22 is configured to send the M VXLAN probe packets to the source VTEP such that the source VTEP forwards the M VXLAN probe packets to the destination VTEP. The receiving component 23 is configured to receive VXLAN advertisement packets reported by the source VTEP, the destination VTEP, and intermediate nodes in the multiple equivalent paths according to the M VXLAN probe packets. The detection component 24 is configured to detect, according to the VXLAN advertisement packet, whether a fault occurs in the equivalent path between the source VTEP and the destination VTEP.

The apparatus in this embodiment may be configured to execute the technical solution of the method embodiment shown in FIG. 3. An implementation principle and a technical effect of the apparatus are similar to those in the method embodiment, and are not described herein again.

Based on the embodiment shown in FIG. 8, the detection component 24 is further configured to determine, according to an IP address of the source VTEP, an IP address of the destination VTEP, a Layer 4 port number of the source VTEP, a Layer 4 port number of the destination VTEP, a protocol type between the source VTEP and the destination VTEP, a TTL, and an ingress port, an egress port, and a system identifier of a device that sends each VXLAN advertisement packet, whether a fault occurs in a path of the multiple equivalent paths, where the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet are carried in the VXLAN advertisement packet.

Optionally, the generation component 21 is further configured to obtain M consecutive source UDP port numbers from a preset source UDP port number range, and generate the M VXLAN probe packets according to the M consecutive source UDP port numbers, the destination UDP port number, and the probe identifier.

Optionally, the probe identifier is set in a reserved field of a VXLAN header of the VXLAN probe packet.

The apparatus in this embodiment may be configured to execute the technical solution of the method embodiment shown in FIG. 4. An implementation principle and a technical effect of the apparatus are similar to those in the method embodiment, and are not described herein again.

Furthermore, based on the embodiment shown in FIG. 8, the generation component 21 is further configured to perform a hash operation on each of N consecutive source UDP port numbers and the IP address of the source VTEP, the IP address of the destination VTEP, the Layer 4 port number of the destination VTEP, and the protocol type between the source VTEP and the destination VTEP to obtain hash values, where N is a maximum value of the source UDP port numbers, and N is a positive integer greater than or equal to 2, group the N consecutive source UDP port numbers into M first sets according to the hash values, where hash values corresponding to all source UDP port numbers in each of the first sets are equal, and M is less than or equal to N, obtain a source UDP port number from each of the first sets to form a second set, and generate the M VXLAN probe packets according to each source UDP port number in the second set, the destination UDP port number, and the probe identifier.

The apparatus in this embodiment may be configured to execute the technical solution of the method embodiment shown in FIG. 5. An implementation principle and a technical effect of the apparatus are similar to those in the method embodiment, and are not described herein again.

Figure 9:
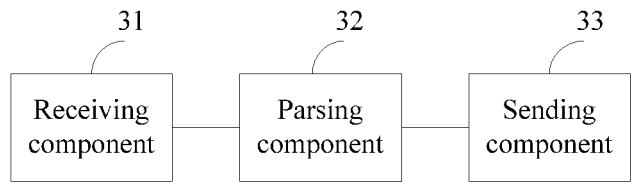
FIG. 9 is a schematic structural diagram of a path detection apparatus according to Embodiment 6 of the present application.

FIG. 9 is a schematic structural diagram of a path detection apparatus according to Embodiment 6 of the present application. As shown in FIG. 9, the apparatus includes a receiving component 31, a parsing component 32, and a sending component 33. The receiving component 31 is configured to receive a VXLAN probe packet, where the VXLAN probe packet includes a source UDP port number, a destination UDP port number, and a probe identifier. The parsing component 32 is configured to parse the VXLAN probe packet to obtain the probe identifier. The sending component 33 is configured to send a VXLAN advertisement packet to a controller according to the probe identifier, where the VXLAN advertisement packet carries the probe identifier, and a source IP address, a destination IP address, a source UDP port number, a destination UDP port, a protocol type, and a TTL in the VXLAN advertisement packet are the same as those in the VXLAN probe packet, and a source MAC address and a destination MAC address in the VXLAN advertisement packet are different from those in the VXLAN probe packet.

The apparatus in this embodiment may be configured to execute the technical solution of the method embodiment shown in FIG. 7. An implementation principle and a technical effect of the apparatus are similar to those in the method embodiment, and are not described herein again.

Optionally, based on the embodiment shown in FIG. 9, the probe identifier is set in a reserved field of a VXLAN header of the VXLAN advertisement packet, and the VXLAN advertisement packet further includes an ingress port, an egress port, and a system identifier of a device that sends the VXLAN advertisement packet.

Figure 10:
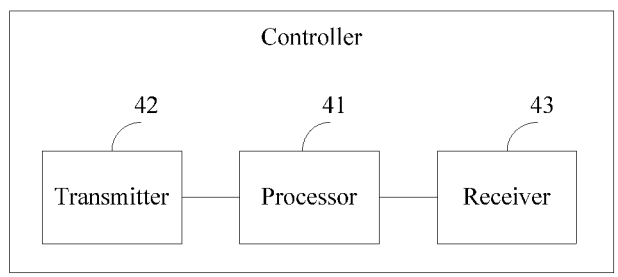
FIG. 10 is a schematic structural diagram of a controller according to Embodiment 7 of the present application.

FIG. 10 is a schematic structural diagram of a controller according to Embodiment 7 of the present application. As shown in FIG. 10, the controller includes a processor 41, a transmitter 42, and a receiver 43. The processor 41 is configured to generate M virtual extensible local area network VXLAN probe packets according to a source UDP port number, a destination UDP port number, and a probe identifier when there are multiple equivalent paths between a source VTEP and a destination VTEP, where M is greater than or equal to 2. The transmitter 42 is configured to send the M VXLAN probe packets to the source VTEP such that the source VTEP forwards the M VXLAN probe packets to the destination VTEP. The receiver 43 is configured to receive VXLAN advertisement packets reported by the source VTEP, the destination VTEP, and intermediate nodes in the multiple equivalent paths according to the M VXLAN probe packets. The processor 41 is further configured to detect, according to the VXLAN advertisement packet, whether a fault occurs in a path of the multiple equivalent paths between the source VTEP and the destination VTEP.

The apparatus in this embodiment may be configured to execute the technical solution of the method embodiment shown in FIG. 3. An implementation principle and a technical effect of the apparatus are similar to those in the method embodiment, and are not described herein again.

Further, when detecting, according to the VXLAN advertisement packet, whether a fault occurs in a path of the multiple equivalent paths between the source VTEP and the destination VTEP, the processor 41 determines, according to an IP address of the source VTEP, an IP address of the destination VTEP, a Layer 4 port number of the source VTEP, a Layer 4 port number of the destination VTEP, a protocol type between the source VTEP and the destination VTEP, a TTL, and an ingress port, an egress port, and a system identifier of a device that sends each VXLAN advertisement packet, whether a fault occurs in a path of the multiple equivalent paths, where the IP address of the source VTEP, the IP address of the destination VTEP, the Layer 4 port number of the source VTEP, the Layer 4 port number of the destination VTEP, the protocol type between the source VTEP and the destination VTEP, the TTL, and the ingress port, the egress port, and the system identifier of the device that sends each VXLAN advertisement packet are carried in the VXLAN advertisement packet.

Optionally, when generating M VXLAN probe packets according to a source UDP port number, a destination UDP port number, and a probe identifier, the processor 41 obtains M consecutive source UDP port numbers from a preset source UDP port number range, and generates the M VXLAN probe packets according to the M consecutive source UDP port numbers, the destination UDP port number, and the probe identifier.

Optionally, the probe identifier is set in a reserved field of a VXLAN header of each VXLAN probe packet.

The apparatus in this embodiment may be configured to execute the technical solution of the method embodiment shown in FIG. 4. An implementation principle and a technical effect of the apparatus are similar to those in the method embodiment, and are not described herein again.

Furthermore, when generating M VXLAN probe packets according to a source UDP port number, a destination UDP port number, and a probe identifier, the processor 41 performs a hash operation on each of N consecutive source UDP port numbers and the IP address of the source VTEP, the IP address of the destination VTEP, the Layer 4 port number of the destination VTEP, and the protocol type between the source VTEP and the destination VTEP to obtain hash values, where N is a maximum value of the source UDP port numbers, and N is a positive integer greater than or equal to 2, groups the N consecutive source UDP port numbers into M first sets according to the hash values, where hash values corresponding to all source UDP port numbers in each of the first sets are equal, and M is less than or equal to N, obtains a source UDP port number from each of the first sets to form a second set, and generates the M VXLAN probe packets according to each source UDP port number in the second set, the destination UDP port number, and the probe identifier.

The apparatus in this embodiment may be configured to execute the technical solution of the method embodiment shown in FIG. 5. An implementation principle and a technical effect of the apparatus are similar to those in the method embodiment, and are not described herein again.

Figure 11:
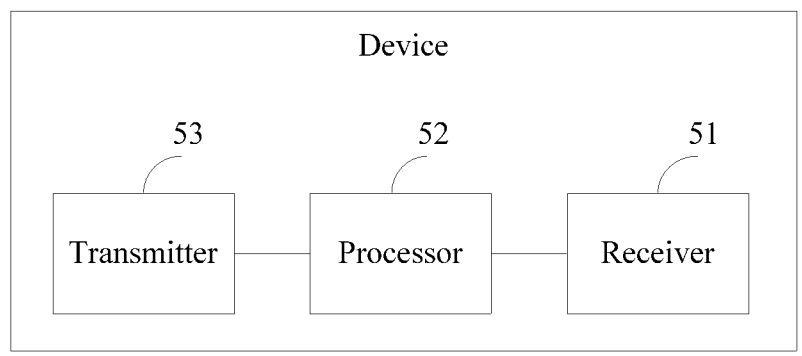
FIG. 11 is a schematic structural diagram of a device according to Embodiment 8 of the present application.

FIG. 11 is a schematic structural diagram of a device according to Embodiment 8 of the present application. As shown in FIG. 11, the device includes a receiver 51, a processor 52, and a transmitter 53. The receiver 51 is configured to receive a VXLAN probe packet, where the VXLAN probe packet includes a source UDP port number, a destination UDP port number, and a probe identifier. The processor 52 is configured to parse the VXLAN probe packet to obtain the probe identifier. The transmitter 53 is configured to send a VXLAN advertisement packet to a controller according to the probe identifier, where the VXLAN advertisement packet carries the probe identifier, and a source IP address, a destination IP address, a source UDP port number, a destination UDP port, a protocol type, and a TTL in the VXLAN advertisement packet are the same as those in the VXLAN probe packet, and a source MAC address and a destination MAC address in the VXLAN advertisement packet are different from those in the VXLAN probe packet.

The apparatus in this embodiment may be configured to execute the technical solution of the method embodiment shown in FIG. 7. An implementation principle and a technical effect of the apparatus are similar to those in the method embodiment, and are not described herein again.

Optionally, in this embodiment shown in FIG. 11, the probe identifier is set in a reserved field of a VXLAN header of the VXLAN advertisement packet, and the VXLAN advertisement packet further includes an ingress port, an egress port, and a system identifier of a device that sends the VXLAN advertisement packet.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A path detection method, comprising:
generating M virtual extensible local area network (VXLAN) probe packets according to a source User Datagram Protocol (UDP) port number, a destination UDP port number, and a probe identifier when there are a plurality of equivalent paths between a source VXLAN tunnel endpoint (VTEP) and a destination VTEP, wherein M is greater than or equal to two;
sending the M VXLAN probe packets to the source VTEP to forward the M VXLAN probe packets to the destination VTEP;
receiving VXLAN advertisement packets from the source VTEP, the destination VTEP, and intermediate nodes in the equivalent paths according to the M VXLAN probe packets;
detecting, according to the VXLAN advertisement packets, whether a fault occurs in a path of the equivalent paths between the source VTEP and the destination VTEP; and
sending alarm information comprising fault path information to a user equipment to inform a user that the path is faulty.

2. The path detection method of claim 1, wherein detecting whether the fault occurs in the path of the equivalent paths between the source VTEP and the destination VTEP comprises determining, according to an Internet Protocol (IP) address of the source VTEP, an IP address of the destination VTEP, a Layer 4 port number of the source VTEP, a Layer 4 port number of the destination VTEP, a protocol type between the source VTEP and the destination VTEP, a time to live (TTL), and an ingress port, an egress port, and a system identifier of a device sending each VXLAN advertisement packet, whether the fault occurs in the path of the equivalent paths, and wherein the IP address of the source VTEP, the IP address of the destination VTEP, the Layer 4 port number of the source VTEP, the Layer 4 port number of the destination VTEP, the protocol type between the source VTEP and the destination VTEP, the TTL, the ingress port, the egress port, and the system identifier of the device sending each VXLAN advertisement packet are carried in the VXLAN advertisement packets.

3. The path detection method of claim 1, wherein generating the M VXLAN probe packets comprises generating the M VXLAN probe packets according to M consecutive source UDP port numbers from a preset source UDP port number range, the destination UDP port number, and the probe identifier.

4. The path detection method of claim 1, wherein generating the M VXLAN probe packets comprises:
performing a hash operation on each of N consecutive source UDP port numbers and an Internet Protocol (IP) address of the source VTEP, an IP address of the destination VTEP, a Layer 4 port number of the destination VTEP, and a protocol type between the source VTEP and the destination VTEP to obtain hash values, wherein N comprises a maximum value of the source UDP port numbers, and wherein N comprises a positive integer greater than or equal to two;
grouping the N consecutive source UDP port numbers into M first sets according to the hash values, wherein hash values corresponding to all source UDP port numbers in each of the M first sets are equal, and wherein M is less than or equal to N;
obtaining a source UDP port number from each of the M first sets to form a second set; and
generating the M VXLAN probe packets according to each source UDP port number in the second set, the destination UDP port number, and the probe identifier.

5. The path detection method of claim 1, wherein the probe identifier is set in a reserved field of a VXLAN header of each VXLAN probe packet.

6. The path detection method of claim 2, wherein generating the M VXLAN probe packets comprises generating the M VXLAN probe packets according to M consecutive source UDP port numbers from a preset source UDP port number range, the destination UDP port number, and the probe identifier.

7. The path detection method of claim 2, wherein generating the M VXLAN probe packets comprises:
performing a hash operation on each of N consecutive source UDP port numbers and the IP address of the source VTEP, the IP address of the destination VTEP, the Layer 4 port number of the destination VTEP, and the protocol type between the source VTEP and the destination VTEP to obtain hash values, wherein N comprises a maximum value of the source UDP port numbers, and wherein N comprises a positive integer greater than or equal to two;

grouping the N consecutive source UDP port numbers into M first sets according to the hash values, wherein hash values corresponding to all source UDP port numbers in each of the M first sets are equal, and wherein M is less than or equal to N;

obtaining a source UDP port number from each of the M first sets to form a second set; and generating the M VXLAN probe packets according to each source UDP port number in the second set, the destination UDP port number, and the probe identifier.

8. A path detection method, comprising:

receiving M virtual extensible local area network (VXLAN) probe packets, wherein a VXLAN probe packet selected from the M VXLAN probe packets comprises a source User Datagram Protocol (UDP) port number, a destination UDP port number, and a probe identifier when there are a plurality of equivalent paths between a source VXLAN tunnel endpoint (VTEP) and a destination VTEP, and wherein M is greater than or equal to two;

sending VXLAN advertisement packets to a controller according to the probe identifier, wherein a VXLAN advertisement packet selected from the VXLAN advertisement packets carries the probe identifier, and wherein the probe identifier is set in a reserved field of a VXLAN header of the VXLAN advertisement packet; and receiving alarm information comprising fault path information indicating whether a fault occurs in a path of the equivalent paths between the source VTEP and the destination VTEP, wherein a source Internet Protocol (IP) address, a destination IP address, a source UDP port number, a destination UDP port, a protocol type, and a time to live (TTL) in the VXLAN advertisement packet are the same as those in the VXLAN probe packet, and wherein a source media access control (MAC) address and a destination MAC address in the VXLAN advertisement packet are different from those in the VXLAN probe packet.

9. The path detection method of claim 8, wherein the VXLAN advertisement packet further comprises an ingress port, an egress port, and a system identifier of a device sending the VXLAN advertisement packet.

10. A path detection apparatus, comprising:

a memory configured to store program instructions; and a processor coupled to the memory, wherein the program instructions cause the processor to be configured to:

generate M virtual extensible local area network (VXLAN) probe packets according to a source User Datagram Protocol (UDP) port number, a destination UDP port number, and a probe identifier when there are a plurality of equivalent paths between a source VXLAN tunnel endpoint (VTEP) and a destination VTEP, wherein M is greater than or equal to two;

send the M VXLAN probe packets to the source VTEP to forward the M VXLAN probe packets to the destination VTEP;

receive VXLAN advertisement packets from the source VTEP, the destination VTEP, and intermediate nodes in the equivalent paths according to the M VXLAN probe packets;

detect, according to the VXLAN advertisement packets, whether a fault occurs in a path of the equivalent paths between the source VTEP and the destination VTEP; and send alarm information comprising fault path information to a user equipment to inform a user that the path is faulty.

11. The path detection apparatus of claim 10, wherein the program instructions further cause the processor to be configured to determine, according to an Internet Protocol (IP) address of the source VTEP, an IP address of the destination VTEP, a Layer 4 port number of the source VTEP, a Layer 4 port number of the destination VTEP, a protocol type between the source VTEP and the destination VTEP, a time to live (TTL), an ingress port, an egress port, and a system identifier of a device sending each VXLAN advertisement packet, whether the fault occurs in the path of the equivalent paths, and wherein the IP address of the source VTEP, the IP address of the destination VTEP, the Layer 4 port number of the source VTEP, the Layer 4 port number of the destination VTEP, the protocol type between the source VTEP and the destination VTEP, the TTL, the ingress port, the egress port, and the system identifier of the device sending each VXLAN advertisement packet are carried in the VXLAN advertisement packets.

12. The path detection apparatus of claim 10, wherein the program instructions further cause the processor to be configured to generate the M VXLAN probe packets according to M consecutive source UDP port numbers from a preset source UDP port number range, the destination UDP port number, and the probe identifier.

13. The path detection apparatus of claim 10, wherein the program instructions further cause the processor to be configured to:

perform a hash operation on each of N consecutive source UDP port numbers and an Internet Protocol (IP) address of the source VTEP, an IP address of the destination VTEP, a Layer 4 port number of the destination VTEP, and a protocol type between the source VTEP and the destination VTEP to obtain hash values, wherein N comprises a maximum value of the source UDP port numbers, and wherein N further comprises a positive integer greater than or equal to two;

group the N consecutive source UDP port numbers into M first sets according to the hash values, wherein hash values corresponding to all source UDP port numbers in each of the M first sets are equal, and wherein M is less than or equal to N;

obtain a source UDP port number from each of the M first sets to form a second set; and generate the M VXLAN probe packets according to each source UDP port number in the second set, the destination UDP port number, and the probe identifier.

14. The path detection apparatus of claim 10, wherein the probe identifier is set in a reserved field of a VXLAN header of each VXLAN probe packet.

15. The path detection apparatus of claim 11, wherein the program instructions further cause the processor to be configured to generate the M VXLAN probe packets according to M consecutive source UDP port numbers from a preset source UDP port number range, the destination UDP port number, and the probe identifier.

16. The path detection apparatus of claim 11, wherein the program instructions further cause the processor to be configured to:

perform a hash operation on each of N consecutive source UDP port numbers and the IP address of the source VTEP, the IP address of the destination VTEP, the Layer 4 port number of the destination VTEP, and the protocol type between the source VTEP and the destination VTEP to obtain hash values, wherein N comprises a maximum value of the source UDP port numbers, and wherein N comprises a positive integer greater than or equal to two;

group the N consecutive source UDP port numbers into M first sets according to the hash values, wherein hash values corresponding to all source UDP port numbers in each of the M first sets are equal, and wherein M is less than or equal to N;

obtain a source UDP port number from each of the M first sets to form a second set; and generate the M VXLAN probe packets according to each source UDP port number in the second set, the destination UDP port number, and the probe identifier.

17. A path detection apparatus, comprising:

a memory configured to store program instructions; and a processor coupled to the memory, wherein the program instructions cause the processor to be configured to:

receive M virtual extensible local area network (VXLAN) probe packets, wherein a VXLAN probe packet selected from the M VXLAN probe packets comprises a source User Datagram Protocol (UDP) port number, a destination UDP port number, and a probe identifier when there are a plurality of equivalent paths between a source VXLAN tunnel endpoint (VTEP) and a destination VTEP, and wherein M is greater than or equal to two;

send VXLAN advertisement packets to a controller according to the probe identifier, wherein a VXLAN advertisement packet selected from the VXLAN advertisement packets carries the probe identifier, and wherein the probe identifier is set in a reserved field of a VXLAN header of the VXLAN advertisement packet; and receive alarm information comprising fault path information indicating whether a fault occurs in a path of the equivalent paths between the source VTEP and the destination VTEP, wherein a source Internet Protocol (IP) address, a destination IP address, a source UDP port number, a destination UDP port, a protocol type, and a time to live (TTL) in the VXLAN advertisement packet are the same as those in the VXLAN probe packet, and wherein a source media access control (MAC) address and a destination MAC address in the VXLAN advertisement packet are different from those in the VXLAN probe packet.

18. The path detection apparatus of claim 17, wherein the VXLAN advertisement packet further comprises an ingress port, an egress port, and a system identifier of a device sending the VXLAN advertisement packet.

19. The path detection method of claim 8, wherein the probe identifier comprises a flag value that identifies the VXLAN probe packet.

20. The path detection apparatus of claim 17, wherein the probe identifier comprises a flag value that identifies the VXLAN probe packet.

* * * * *